July 30, 1968  H. D. CRANE  3,395,295
SOLID-STATE DETECTOR
Filed Sept. 8, 1964  2 Sheets-Sheet 1
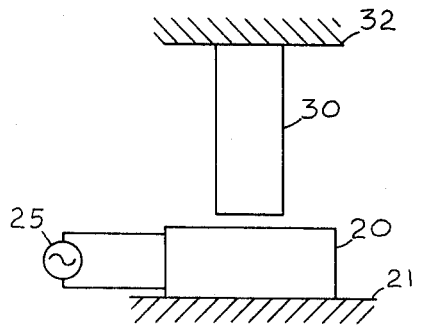
Fig. 1
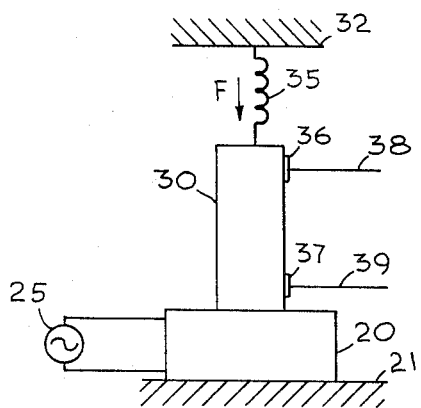
Fig. 2
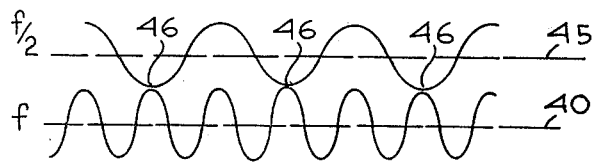
Fig. 3
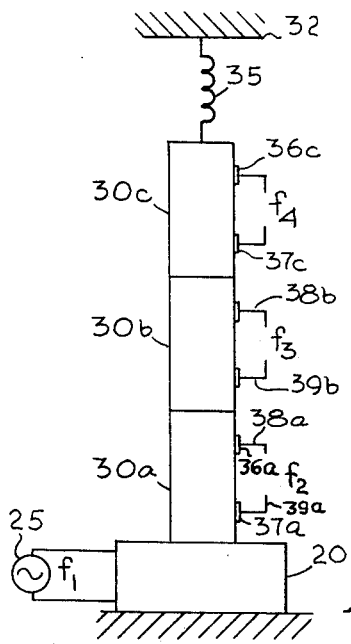
Fig. 4
Fig. 5
INVENTOR
HEWITT D. CRANE
BY Samuel Lindenberg
Abraham Wasserman
ATTORNEYS

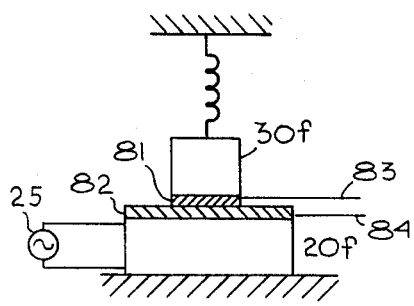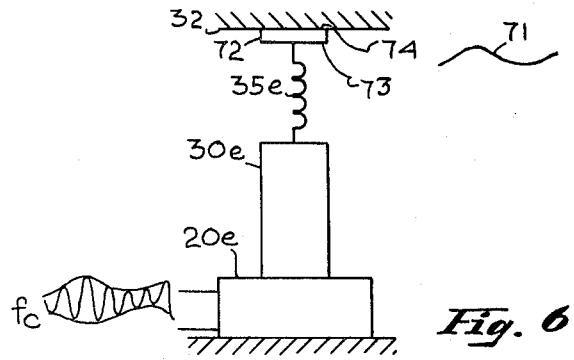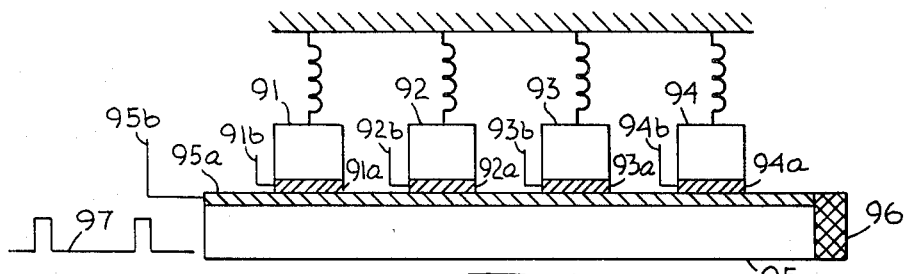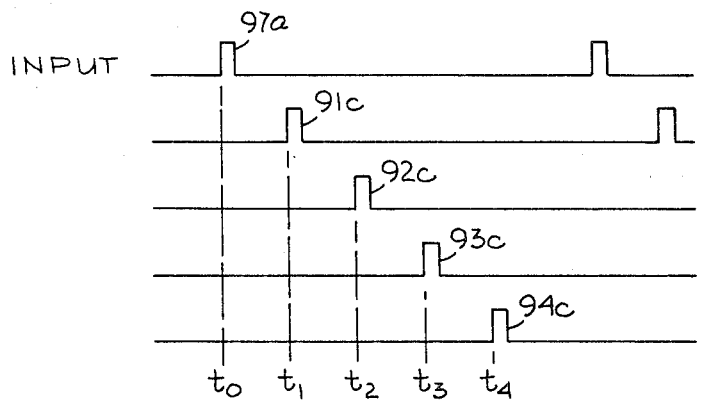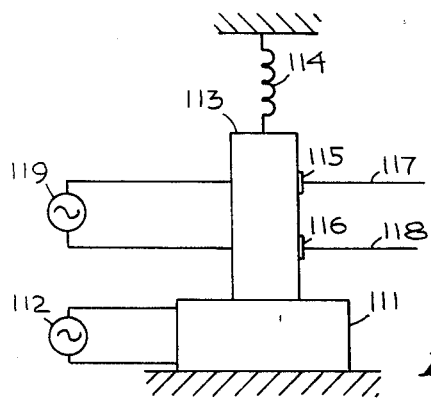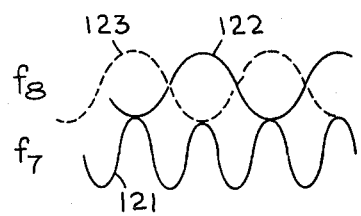

United States Patent Office 3,395,295
Patented July 30, 1968

3,395,295
SOLID-STATE DETECTOR
Hewitt D. Crane, Palo Alto, Calif., assignor to Stanford Research Institute, Menlo Park, Calif., a corporation of California
Filed Sept. 8, 1964, Ser. No. 394,961
17 Claims. (Cl. 310—8.1)

This invention relates to solid-state devices, and more particularly, to improved mechanical and electromechanical solid-state detectors.

Recently developed components are made of solid-state materials. These are used to replace equivalent electrical arrangements which are subject to constant maintenance and require repeated replacement of parts. Solid-state materials have advantageous properties such as substantially linear mechanical characteristics, relatively loss-free performance when operated under particular conditions dependent on the type of solid-state material, and a substantially long performance life.

Most solid-state devices generally are operated within ranges in which the mechanical properties of the solid are substantially linear. Performance under conditions when such properties are not linear are generally avoided since they are exhibited only when the solids are subjected to high stress amplitudes approaching the elastic limits of such solids. Yet, in attempting to develop mechanical systems equivalent to conventional nonlinear electrical arrangements, means have to be developed to produce nonlinearity in basic mechanical parameters of known solids without having to subject such solids to stress amplitudes which approach or exceed their elastic limits.

Accordingly, it is an object of the present invention to provide an improved system based on the elastic mechanical vibrational properties of solid matter.

Another object of the present invention is the provision of a novel system based on the interaction of solids having mechanical elastic vibrational properties.

Yet another object of the present invention is the provision of a novel system wherein nonlinear mechanical properties are produced in solids without subjecting the solids to strain forces approaching or exceeding the elastic limits thereof.

Still another object of the present invention is the provision of a simple and useful system based on the mechanical vibrational properties of solids subjected to controlled elastic mechanical impacting.

A further object of the present invention is the provision of a system for producing desired output signals as a function of the nonlinear mechanical phenomena produced in colliding solids having selected elastic vibrational properties.

These and other objects of the invention may be achieved by providing a system in which vibrational energy is transferred between solid-state materials during controlled elastic collisions between them. Elastic collision or impact between two parts of a mechanical system has been found to produce strong useful mechanical nonlinear effects without subjecting either part of the mechanical system to high strain conditions. When the two parts of the mechanical system collide, the coupling between them undergoes a drastic change even though the total motion of the two parts of the mechanical system may be quite small. Before the two parts of the mechanical system collide, they are effectively isolated. However, during the collision, strong interaction occurs between them, during which forces exerted by one part of the mechanical system are directly applied to the other. The rate at which forces can be exerted by one part of the system and applied to the other, is a function of the rate of elastic collisions or impacts between the two parts of the system, the latter phenomena being directly related to the mechanical vibrational characteristics of the two parts of the system as well as the energy used to sustain the elastic collisions.

Briefly, the present invention may be described in conjunction with an application in which a follower element comprising one part of a mechanical system is positioned adjacent an electrostrictive type crystal which is electrically excited. The upper surface of the crystal vibrates up and down, elastically colliding with the follower element, at which time mechanical energy is transferred to the follower element. The element may, due to its mechanical vibrational properties, convert the impact energy into detectable vibratory motion, which may in turn be detected to produce related output signals. Also, the elastic collisions between the two elements may be detected to produce related output information.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

FIGURE 1 is a front elevational view of an arrangement useful in explaining the present invention;

FIGURE 2 is a front elevational view of a preferred arrangement of the present invention of a frequency divider;

FIGURE 3 is a diagram of waveforms useful in explaining the operation of the embodiment of the invention of FIGURE 2;

FIGURE 4 is a front elevational view of an embodiment of the invention used as a multifrequency divider;

FIGURE 5 is a waveform diagram useful in explaining the operation of the multifrequency divider shown in FIGURE 4;

FIGURE 6 is a front elevational view of an embodiment of the invention in conjunction with a rectifying detector;

FIGURE 7 is a front elevational view of an embodiment of the present invention as a high speed synchronous switch;

FIGURE 8 is a front elevational view of an embodiment of the present invention in conjunction with a multi-contact high speed synchronous switching arrangement;

FIGURE 9 is a diagram of waveforms useful in explaining the operation of the arrangement shown in FIGURE 8;

FIGURE 10 is a front elevational view of an embodiment of the present invention in conjunction with a digital computing storage circuit; and FIGURE 11 is a diagram of waveforms useful in explaining the operation of the storage circuit shown in FIGURE 10.

FIGURE 1 is a front elevational view of an arrangement useful in explaining the principles of the present invention. A crystal 20 having an electrostrictive characteristic is mounted on a base 21. The crystal is connected to a source of electrical energy such as a sinusoidal voltage source 25. A rod-like follower element 30 is supported by a frame 32, so that the lower end of the rod 30 and the upper surface of the crystal 20 are adjacent one another. Hereinafter, the crystal 20 and the follower element 30 will also be referred to as the driven crystal and the follower rod respectively. The spacing between the lower end of the follower rod 30 and the upper surface of the driven crystal 20 is carefully controlled so that when the crystal 20 is excited by a signal at a given frequency from the source 25, the upper surface thereof vibrates up and down at a rate and amplitude which are related to the frequency of the exciting signal and its amplitude respectively. When the upper surface of the crystal 20 is at its highest point, it collides with the lower end of the rod 30, thus producing an elastic collision between the two surfaces and a transfer of mechanical energy between the two elements.

The rate of collision between the two elements is related to the rate at which the upper surface of the element 20 vibrates up and down, as well as the selected natural resonant mode of vibration in the longitudinal direction of the follower rod 30. Rod-like crystals which are long and slender possess a plurality of natural resonant modes or frequencies of longitudinal vibration. However, by properly damping the rod, it is possible to suppress all but one natural frequency of longitudinal vibrations. Thus, for explanatory purposes, whenever reference is made to the lowest natural resonant mode of longitudinal vibration of any of the rods to be described hereinafter, it is assumed that such rods are damped so that all other resonant frequencies of longitudinal vibration are suppressed. Similarly, for explanatory purposes, it is assumed that the driven crystals 20 are damped so that they vibrate at the frequency of the exciting signal from source 25.

For example, let us assume that the lowest natural resonant mode of longitudinal vibration of the follower rod 30 is at a frequency equal to half the frequency of vibration of the driven crystal 20. Then the impacts or collisions occur once for each cycle of the rod's vibration when its end is in its lowest position, and once every other cycle of the vibration of the element 20 when its upper face is in the highest position. In this manner, mechanical energy is delivered from the driven crystal 20 to the follower rod 30 at a rate which is a function of the vibrational characteristics of the driven element 20 as well as the follower element 30. The frequency of vibration of the follower rod 30 or the number of collisions between the elements 20 and 30 may be conveniently detected to produce output signals which are related to the elastic impacts occurring between the two elements.

Although the arrangement shown in FIGURE 1 operates quite satisfactorily, it is seen that the spacing between the lower end of the follower element 30 and the upper surface of the element 20 is quite critical since too small a spacing between the surfaces would interfere with the free vibration of the driven crystal 20. On the other hand too large a spacing between the two elements would decouple the follower rod 30 completely from the driven crystal 20 and, thus, prevent elastic collisions from occurring between the elements, thereby terminating any transfer of mechanical energy therebetween. Therefore, in a preferred embodiment of the present invention, an arrangement is provided wherein the problem of spacing the driven element 20 from the follower element 30 is completely eliminated.

Reference is now made to FIGURE 2 which is a preferred arrangement of the present invention of a frequency divider. As seen therein, the follower rod 30 is supported by the frame 32 through a spring 35 which supplies a restoring force, generally indicated by an arrow F. The force F tends to press the rod against the upper surface of the driven crystal 20, so that with no electrical excitation of the element 20, the rod-to-crystal spacing is zero. However, as the driven crystal 20 is excited and starts to vibrate, its upper surface raises the rod 30 against the restoring force F to a height which is a function of the maximum vertical position of the upper surface of the driven element 20. The mass of the rod 30, together with the spring 35, comprise a low frequency resonant system which cannot follow exactly the excursions of the crystal element's upper surface. Instead, the lower end of the element 30 adopts an average position, so that elastic collisions between the lower end thereof and the upper face of the crystal 20 occur only when the upper surface of the crystal 20 is near the top of its motion.

The preferred arrangement of the present invention shown in FIGURE 2 thus eliminates the problem of spacing the driven crystal 20 with respect to the follower rod 30. Rather, the arrangement shown provides for a natural adjustment of the crystal-to-rod spacing, automatically adjusting the spacing for different amplitudes of the vibration of the driven crystal 20. Such automatic adjustment is accomplished by the lower end of the rod 30 adopting an average position with respect to the maximum vertical vibrational motion of the upper surface of the driven crystal 20.

As previously explained, the frequency of vibration of the follower rod 30, or the rate of collision between the crystal 20 and the rod 30 may be detected to produce signals related to such phenomena. Such a detector may best be explained by referring again to FIGURE 2 which is a preferred arrangement of the present invention, and to FIGURE 3 which is a diagram of waveforms useful in explaining the mode of operation of the frequency divider shown in FIGURE 2. Let us assume that the crystal 20 is driven to vibrate at a frequency $f$ in response to signals from source 25, and the follower rod 30, having piezoelectric properties, has a lowest natural resonant mode of vibration in the longitudinal direction thereof at a frequency equal to $f/2$. From the foregoing description, it is seen that the upper surface of the crystal 20 will vibrate up and down at a frequency equal to $f$ about a steady state position indicated by a dashed line 40. The amplitude of vibration of the upper surface of the crystal 20 is directly related to the amplitude of the exciting sinusoidal voltage. As a consequence of the vertical motion of the crystal's upper surface, the lower end of the rod will take up an average position indicated by a dashed line 45, with the lower end vibrating at a frequency equal to the lowest natural resonant frequency of longitudinal vibration of the rod 30. Collisions will thus take place between the upper surface of the crystal 20 and the lower end of the follower rod 30, once each cycle of the rod vibration and once every other cycle of the crystal's vibration. The collisions are indicated in FIGURE 3 by numerals 46.

Conventional detecting techniques may be used to provide output electrical signals related to the rate of vibration of the follower rod 30. For example, electrodes 36 and 37 suitably fastened to the rod 30 having piezoelectric properties, may be used to provide, by means of signal output lines 38 and 39, output signals at a frequency of $f/2$, which is equal to the frequency of vibration of the follower rod 30. The preferred arrangement shown in FIGURE 2 thus operates as a frequency divider, providing output signals at a frequency which is half the frequency of the input signals supplied from the voltage source 25. The follower rod 30 shown in FIGURE 2 need not be limited to one having a lowest natural resonant frequency equal to one-half the driving frequency. It is apparent from the foregoing, that a rod whose natural resonant is a rational fraction $m/n$ (where $m$ and $n$ are integers) of the driving frequency may be used to provide output signals at rational subfrequencies of the driving signal supplied by the driving source 25.

The basic teachings of the present invention are similarly adapted to be employed in a multifrequency divider, in which the frequency of an energizing input signal is divided to provide a plurality of output signals each one of which is at a frequency related to the frequency of the input signal. Reference is now made to FIGURE 4 wherein a preferred embodiment of the present invention is shown in conjunction with a multifrequency divider, and to FIGURE 5 which is a diagram of waveforms useful in explaining the operation of the multifrequency divider of FIGURE 4. As seen in FIGURE 4, the arrangement comprises the driven crystal 20 excited by the voltage source 25 with a sinusoidal signal 50 (FIGURE 6) at a frequency $f1$. A plurality of follower elements $30a$, $30b$, and $30c$, are shown stacked on top of one another, on top of the upper surface of the driven crystal 20, the upper surface of the top follower element $30c$ being connected to the frame 32 by the restoring spring 35. Let us assume that the following element 30a has a lowest natural resonant mode of vibration at a frequency $f2$ which is half the frequency $f1$. Then, in light of the foregoing description and in particular the description in conjunction with FIGURES 2 and 3, it is apparent that the follower element 30a will vibrate at its natural resonant frequency of $f2$. The vibrations of the follower element 30a are detected by electrodes 36a and 37a to provide on output lines 38a and 39a an output signal 51 at a frequency $f2$. The frequency $f2$, as previously explained, is equal to half the energizing frequency $f1$. The points of elastic collisions between the vibrating driven crystal 20 and the follower element 30a are designated in FIGURE 5 by numerals 52.

The follower element 30a, in addition to colliding with the driven crystal 20, at a rate which is a function of the vibrational characteristics of both elements, also collides with the follower element 30b mounted on top of it. The element 30a acts as a driven crystal with respect to the follower element 30b, thus transmitting mechanical energy to element 30b at each instant of elastic collision between the two elements. The rate of vibration of the follower element 30b is a result of the mechanical energy transmitted thereto by the vibrations of element 30a and its own natural resonant mode of vibration in its longitudinal axis.

Assuming that the natural resonant mode of vibration of the follower element 30b is at a frequency $fb$, $f3$ being equal to one-half the frequency $f2$ at which the follower element 30a vibrates, it is seen that the impacts between the elements 30a and 30b occur once for each cycle of the vibration of element 30b when its lower end is in the lowest position and once every other cycle of the vibration of element 30b when its upper face is in the highest position. The vibration of the follower element 30b may be similarly detected by electrodes 36b and 37b to provide on lines 38b and 39b, an output signal 53 at a frequency equal to the normal resonant mode of vibration of the follower element 30b which is equal to $f3$. The frequency of the output signal produced by the follower element 30b equals one-half the frequency of vibration of the element 30a which serves as the source of mechanical energy transmitted to the follower element 30b so as to produce the vibrational motion therein. The points of elastic collision between the elements 30a and 30b are designated in FIGURE 5 by numerals 54.

The element 30b, in addition to receiving mechanical energy from the element 30a, also acts as a source of energy by providing mechanical energy to the follower element 30c mounted thereon. The energy to the element 30c is transmitted at the instances of collision between the elements 30b and 30c. The collisions between them are a function of the rate of vibration of element 30b and the natural resonant mode of vibration of element 30c which, for explanatory purposes, is assumed to be equal to a frequency $f4$ which is half the frequency $f3$ at which the rod 30b vibrates. The impacts between the elements 30b and 30c occur once for every other cycle of vibration of element 30b vibrating at a frequency $f3$, and once every cycle of the vibration of element 30c. Thus, mechanical energy is transmitted by element 30b to element 30c at a frequency $f4$ equal to one-half the frequency $f3$ with the vibrations of 30c being detected to produce an output signal 55. The points of collision between the elements 30b and 30c are designated in FIGURE 5 by numerals 56.

From the foregoing description, it is seen that the energizing signal 50 supplied to the driven crystal 20 at a frequency $f1$ is used to produce a plurality of output signals 51, 53, and 55, each one being at a different frequency. The particular frequency of each one of the output signals is a function of the natural resonant mode of longitudinal vibration of its respective follower element. However, all elements preceding it must be properly selected and arranged so that the respective element is actually driven at the desired resonant frequency.

Reference is now made to FIGURE 6 wherein an embodiment of the present invention in conjunction with a rectifying diode action is shown. The arrangement shown in FIGURE 6 is similar to that of FIGURE 2 except that in the arrangement shown in FIGURE 2, the follower element 30 has been assumed to have a lowest natural resonant mode of vibration at a frequency equal to half the frequency with which the driven crystal 20 is energized. But, in the arrangement shown in FIGURE 6, the element 30e is assumed simply to be a mass element, which, together with the restoring spring 35e, have a low natural resonant vibration frequency with respect to the crystal 20e shown therein. In addition, it is assumed that the crystal 20e is driven or excited by an amplitude-modulated signal at a frequency $fc$. Since the natural resonant mode of vibration of the mass 30e is quite low with respect to the vibration of the crystal 20e, the follower mass 30e will not be capable of following the relatively high frequency vibrations of the crystal 20e and will only ride on the peaks of the vibrational motions of the crystals 20e. Thus, the mass 30e follows only the envelope of the vibrational motion of the crystal 20e.

The follower 30e, vibrating back and forth in accordance with the envelope of the vibrational motion of the driven element 20e, can be directly used to radiate energy. Thus, by purely mechanical means, energy may be abstracted and delivered at the envelope of the amplitude-modulated input signal $fc$. In addition, an electrical output signal 71, in accordance with the envelope of the input signal may be obtained. This is accomplished by inserting a piezoelectric element 72 between the spring 35e and frame 32. The element 72 is squeezed and released in synchronism with the mass element 30e which presses on the spring 35e. The input mechanical motion of the piezoelectric element 72 is converted to the related electrical signal 71 which is impressed on output lines 73 and 74 properly connected to element 72.

Hereinbefore, the driven elements have been described as electrostrictive elements, their vibrational motion being produced by energizing them with a signal from a source of electrical energy such as the source 25 (FIGURES 1, 2, and 4). In addition, the follower elements have been described as rod-like members properly damped so as to vibrate only in the lowest resonant modes of longitudinal vibration. However, in light of the foregoing, it is seen that the driven elements need not have electrostrictive properties. Rather, the elements may be mechanically driven to vibrate in a selected mode so as to collide with one or more follower elements. The follower elements may be rod-like with piezoelectric properties or of any other selected configuration and characteristics. For example, in FIGURE 6, the element 30e is a mass having a low resonant vibrational frequency with respect to the frequency of vibration frequency with respect to the follower elements may be used to produce collisions with elements driven by either electrical or mechanical means. Thus, the teachings of the present invention are not limited to producing electrical output signals in response to electrical input signals. Rather, electrical and/or mechanical signals may be produced in response to electrical and/or mechanical energy supplied to any of the arrangements described herein.

Reference is now made to FIGURE 7 wherein an embodiment of the present invention in conjunction with a high speed switching circuitry is shown. As seen therein, a follower element 30f having an electrically conducting lower end 81 is shown mounted on a driven crystal 30f having an electrically conducting upper surface layer 82. The layers 81 and 82 are shown connected to conductors 83 and 84 respectively. In the steady state condition, namely, when the driven crystal 20f is not excited by the voltage source 25, the spacing between the rod 30f and the crystal 20f is substantially zero. Thus, the two layers 81 and 82 are in electrical contact so that continuity is provided between the conductors 83 and 84. However, as soon as the crystal 20f is energized by the voltage source 25, and starts to vibrate, the electrical continuity between the layers 81 and 82 is interrupted. Electrical continuity is renewed during each elastic collision between the follower element 30f and the crystal 20f. Thus, the electrical continuity between the conductors 83 and 84 is directly related to the number of impacts as well as the rate of impacts bteween the rod 30f and the crystal 20f during which the layers 81 and 82 are in electrical contact.

The arrangement shown in FIGURE 7 is analogous to a switching circuitry in which contacts close at a predetermined rate, the duration of closure between contacts being a function of the elasticity of collision between the element 30f and the crystal 20f during which the layers 81 and 82 are in electrical contact.

Reference is now made to FIGURE 8 in which an embodiment of the present invention in conjunction with a high speed multiswitching arrangement is shown. As seen therein, follower elements 91 through 94, having lower end electrically conducting layers 91a through 94a respectively, are shown mounted on a driven bar 95. The bar 95, which is supported at one end by a support member 96, has an upper surface electrically conducting layer 95a. A lead 95b is shown connected to the electrical conducting layers 95a, and leads 91b through 94b are shown connected to layers 91a through 94a respectively. From the foregoing description, it is seen that in the steady state condition, electrical continuity is present between the lead 95b and every one of the leads 91b through 94b. However, as soon as the driven bar 95 is energized by electrical signals such as a train of pulses 97, the driven bar 95 starts vibrating and thereby transmitting mechanical energy to the follower elements 91 through 94, so that electrical continuity is present between the lead 95b and any one of the leads 91b through 94b only during the elastic collisions between the bar 95 and the respective rods 91 through 94.

The rate of the elastic collisions between any one of the rods 91 through 94 and the driven bar 95 is a function of the frequency of the pulses in the train 97 as well as the mechanical vibration characteristic of the particular element and the driven bar 95. In addition, the time between elastic collisions of the driven bar 95 with adjacent rods is a function of the spacing of the elements along the bar 95 for a given propagation velocity of an acoustic wave which travels down the bar 95 towards the support member 96.

The time relationship between elastic impacts of adjacent rods shown in FIGURE 8 may best be explained with the aid of a diagram of waveforms shown in FIGURE 9, to which reference is made herein. Let us assume that the follower elements 91 through 94 are equidistantly spaced along the bar 95, and that the rod 95 is energized at time $t_0$ by a pulse 97a from the train of pulses 97. As the pulse 97a travel down the driven bar 95 towards the support member 96, elastic collisions occur between the bar 95 and the rods 91 through 94 at times $t_1$ through $t_4$ as indicated in FIGURE 10 by pulses 91c through 94c, the time between pulses being substantially equal since the spacings of the rods along the bar as well as the propagation velocity of the pulse 97a are substantially constant. The cycle is repeated for each pulse of the input train of pulses 97.

The novel teachings of the present invention, in addition to being employed in conjunction with frequency dividing circuitry and high speed switching arrangements, are also applicable to storage circuitry wherein digital binary signals may be stored. For a better understanding of the manner in which the teachings disclosed herein may be employed in conjunction with such binary storing circuitry, reference is made to FIGURE 10. As seen therein, a driven crystal 111 is shown energized by a signal from a voltage source 112 with a follower element 113 mounted on the crystal 111 by means of a restoring spring 114. A pair of electrodes 115 and 116 are shown connected to a pair of leads 117 and 118 so that the vibrational motion of the follower 113 may be used to produce an analogous electrical output signal. Let us assume that the voltage source 112 energizes the driven crystal 111 with a signal 121 at a frequency $f7$, as shown in FIGURE 11. Let it be further assumed that the follower element 113 possesses a natural resonant mode of vibration which is equal to half the frequency $f7$. In light of the foregoing, and in particular, the description of FIGURES 2 and 3, it is seen that elastic collisions occur between the follower element 113 and the driven crystal 111 once for each cycle of the vibration of element 113 when its lower end is in its lowest position, and once every other cycle of the vibration of crystal 111 when its upper surface is in the highest position, so that the output signal on leads 117 and 118 is at a frequency $f8$ which is substantially equal to half the frequency $f7$ of the energizing signal 121.

The phase relationship of the output signal at the frequency $f8$ with respect to the energizing signal 121 at the frequency $f7$ may take on either one of two modes as indicated by the solid and dashed lines 122 and 123 respectively. The unique ability of the output signal to adopt either of two phase relationships with the energizing signal 121, is used as the basis of storing binary digital information. Storing is accomplished by controlling the phase relationship of the output signal with respect to the energizing signal 121, so that one phase relationship between the two signals represents a binary "one" and the other phase relationship represents a binary "zero." The phase relationship is conveniently controlled by providing a source of energizing signals supplied to the follower element 113, so that its vibrational motion is not at a random phase relationship with respect to the vibration of the crystal 111, but rather adopts a desired one of the two possible relationships subsequent to energizing the driven crystal 111. Such a source is shown in FIGURE 10 as a voltage source 119 connected to the follower element 113. The voltage sources 112 and 119 are phase-related so that the output signal produced on lines 117 and 118 is at a desired phase relationship with the energizing signal 121.

By suitably controlling the amplitude and phase relationships of the signals produced by the voltage sources 112 and 119, as well as controlling signals produced by the voltage sources coupled to arrangements similar to that shown in FIGURE 10, transfer of stored information between one arrangement to another may be accomplished. For example, the output signal of element 113 on lines 117 and 118 may be used to affect the vibration of a similar element in a subsequent stage (not shown), so that the phase relationship between the energizing signal of such a stage and the output signal thereof may be controlled. The vibration within a subsequent stage of an element similar to the element 113 may be affected directly by the vibration of element 113 rather than by electrical signals related thereto. For example, instead of energizing an element in a subsequent stage with output signals on lines 117 and 118, such element may be mechanically coupled to the vibrating element 113. The two elements, though coupled, would vibrate essentially independently. However, the coupling would be sufficient for synchronization purposes, so that the phase relationship between the vibration of such an element and the driven element in the stage thereof may be controlled. Thus, a plurality of stages may be used to provide transfer of information which is extensively employed in present day computers.

Summarizing briefly, the present invention is based on a novel arrangement in which a driven element is excited to vibrate at a selected rate. The driven element which may possess electrostrictive properties, may be excited by any convenient means including electrical and mechanical arrangements. A second element, hereinbefore referred to as the follower element, is positioned or mounted on the driven element. The follower element may be rod-like which is properly damped so that it vibrates only at a selected one of its natural resonant modes of longitudinal vibration. However, other follower elements may be used including elements each having a single natural resonant mode of vibration. As the driven element is energized, it starts vibrating at the selected rate, thereby elastically colliding with the follower element positioned thereon. The characteristics of the collisions between the elements is a function of the vibration of the driven element, as well as the vibrational characteristics of the follower element. Useful output signals are provided by detecting the rate of collisions between the elements and/or the vibrations of the follower element.

Accordingly, a novel arrangement has thus been described which is useful in different applications. The foregoing description, including the specific arrangements, has been presented for explanatory purposes only. It is understood that suitable modifications may be made in the arrangements without departing from the spirit of the invention. Therefore, all suitable modifications and equivalents are intended to fall within the scope of the invention as claimed.

What is claimed is:

1. A solid-state apparatus comprising: a first member; means for energizing said first member to vibrate at a predetermined rate; follower means; means for positioning said follower means for being vibrated as a function of elastic collisions with said first member; and means for deriving signals from said follower means as a function of said elastic collisions between said first member and said follower means.

2. A solid-state apparatus comprising: a first member having electromechanical vibrational properties; means for energizing said first member to vibrate at a predetermined rate; follower means; means for positioning said follower means to vibrate as a function of elastic collisions with said first member; and means for deriving signals as a function of the vibration of said follower means.

3. An apparatus comprising a first member; means for energizing said first member to vibrate at a predetermined rate; at least one secondary member; means for positioning said at least one secondary member so as to be in elastic collisions with said first member, the rate of collisions being a function of at least said predetermined rate; and output means for providing output signals responsive to the elastic collisions between said first member and said at least one secondary member.

4. An apparatus comprising: a first member having electromechanical vibrational properties; means for energizing said first member to vibrate at a predetermined rate; at least one secondary member; means for positioning said at least one secondary member so as to be in elastic collisions with said first member, the rate of collisions being a function of at least said predetermined rate; and output means for providing output signals as a function of the elastic collisions between said first member and said at least one secondary member.

5. An apparatus comprising: first and second members, at least said first member having electrostrictive properties; means for energizing said first member to vibrate at a predetermined rate; means for positioning said second member so as to be in collisions with said first member when said first member vibrates at said predetermined rate, the rate of collisions being a function of at least said predetermined rate of vibration of said first member; and means coupled to said second member for deriving output signals as a function of the collisions between said first and second members.

6. An apparatus comprising: first and second members, at least said second member having piezoelectric vibrational properties; means for energizing said first member to vibrate at a predetermined rate; means for positioning said second member so as to be in collisions with said first member when said first member vibrates at said predetermined rate, the rate of collisions being a function of said predetermined rate of vibration of said first member and the piezoelectric vibrational properties of said second member; and means for deriving output signals from said second member as a function of the collisions between said first and second members.

7. A solid-state device comprising: first and second members, each having electromechanical vibrational properties; first means energizing said first member with signals for vibrating said first member as a function of the electromechanical vibrational properties thereof and the characteristics of said signals; second means positioning said second member so as to be in collisions when said first member is vibrating for vibrating said second member by the collisions thereof with said first member, the vibrations being a function of the electromechanical vibrational properties thereof and said elastic collisions; and means for deriving an output signal as a function of the vibrations of said second member.

8. An apparatus for producing an output signal at a frequency related to the frequency of an input signal comprising: first and second members; means energizing said first member to vibrate at a first frequency; means positioning said second member for being vibrated by elastic collisions thereof when said first member is vibrating the rate of collisions being a function of at least said first frequency; and means for providing an output signal from said second member at a frequency substantially equal to the rate of vibration of said second member.

9. An apparatus for producing an output signal at a frequency related to the frequency of an input signal comprising: first and second members at least said second member having electromechanical vibrational properties; means energizing said first member to vibrate at a first frequency; means positioning said second member for being vibrated by elastic collisions thereof with said first member, the rate of collisions being a function of the vibrations of said first member at said first frequency and the electromechanical vibrational properties of said second member; and means for providing an output signal at a frequency substantially equal to the rate of vibration of said second member.

10. An apparatus for producing output signals at a frequency related to the frequency of input signal comprising: a first member having electrostrictive properties; second member means having piezoelectric properties; means for energizing said first member with input signals to vibrate at a frequency which is a function of the frequency of said input signals; means for positioning said second member means so as to vibrate as a function of elastic collisions thereof with said first member, the rate of collisions being a function of the frequency of vibration of said first member and the vibrational properties of said second member means; and means for deriving output signals as a function of the vibrations of said second member means.

11. An apparatus for producing output signals at a frequency which is a subharmonic of the frequency of input signals comprising: a first member having electrostrictive properties including a resonant frequency of vibration equal to a first frequency; input signal means energizing said first member with input signals for vibrating said first member at said first frequency; a second member having piezoelectric vibrational properties including at least one resonant frequency of vibration equal to a subharmonic of said first frequency; means positioning said second member for being vibrated by elastic collisions thereof with said first member at a rate related to its resonant frequency of vibration; and output means coupled to said second member for providing output signals at a frequency substantially equal to the rate of vibrations of said second member.

12. A solid-state switching device comprising: first and second members, at least one of said members having electromechanical vibrational properties; means for energizing said first member to vibrate at a selected rate; means positioning said second member with respect to said first member for elastically colliding with said first member when said first member is vibrating; and means including first and second electrically conducting means for providing a continuous electrical conductive path between said first and second electrically conducting means when said first and second members elastically collide with one another.

13. A solid-state apparatus comprising a first member having electromechanical vibrational properties; means for energizing said first member to vibrate at a predetermined rate; secondary member means; means positioning said secondary member means for being vibrated as a function of elastic collisions with said vibrating first member, the rates of collisions being a function of at least said predetermined rate of vibration of said first member; and electrical conducting means coupled to said first member and said second member means for providing signals as a function of the rates of collisions between said first member and said second member means.

14. An apparatus comprising: a first member having electrostrictive properties; means for energizing said first member to vibrate at a predetermined rate; $n$ secondary members; means positioning said $n$ secondary members, each for being vibrated as a function of elastic collisions thereof with said vibrating first member, the rate of collisions of each of said $n$ secondary members with said first member being a function of at least said predetermined rate of vibration of said first member; and means including electrically conducting elements coupled said first member and coupled to another of said $n$ secondary members for providing a continuous path of electrical conductivity between said first electrically conducting element and each of said $n$ electrically conducting elements as the secondary member to which said electrically coupled element is coupled is in elastic collision with said first member.

15. A solid-state apparatus comprising first member means; means for energizing said first member means to vibrate at predetermined rates; second member means; means for positioning said second member means so as to vibrate as a function of elastic collisions thereof with said first member means; and means for controlling the phase relationships between the vibrations of said first and second member means.

16. A solid-state apparatus comprising a first member; means for energizing said first member to vibrate at a predetermined rate; a second member; means for positioning said second member so as to vibrate as a function of elastic collisions thereof with said first member; and means for controlling the phase relationship between the vibrations of said first and second members.

17. A solid-state apparatus as recited in claim 16 further including means for providing a signal responsive to the vibrations of said second member.

No references cited.

J. D. MILLER, *Primary Examiner.*